United States Patent [19]
Moore

[11] Patent Number: 5,907,966
[45] Date of Patent: Jun. 1, 1999

[54] ROLLED-FORMED SEAT AND RETAINER FOR A FLUID-TIGHT FERRULE SEAL ON A RIGID METAL TUBE WHICH IS HARDER THAN THE FERRULE, METHOD AND APPARATUS

[76] Inventor: Boyd B. Moore, 427 Mignon, Houston, Tex. 77024

[21] Appl. No.: 08/666,846

[22] Filed: Jun. 19, 1996

[51] Int. Cl.[6] ............................................. B21D 17/04
[52] U.S. Cl. ..................................... 72/121; 72/211
[58] Field of Search ........................... 72/71, 121, 211; 30/102

[56] References Cited

U.S. PATENT DOCUMENTS

| | | |
|---|---|---|
| 52,715 | 2/1866 | Howarth . |
| 524,400 | 8/1894 | Rinman . |
| 909,182 | 1/1909 | Hart . |
| 1,484,023 | 2/1924 | Hayter . |
| 1,674,440 | 6/1928 | McCloskey . |
| 2,057,014 | 10/1936 | Dahl ........................................ 30/102 |
| 2,147,032 | 2/1939 | Haury ...................................... 30/102 |
| 2,235,616 | 3/1941 | Ice ........................................... 72/211 |
| 2,948,170 | 8/1960 | Kemp ....................................... 81/15 |
| 3,013,335 | 12/1961 | Kowal ...................................... 30/94 |
| 3,041,723 | 7/1962 | Franck ..................................... 30/102 |
| 3,071,993 | 1/1963 | Foster, Sr. ................................ 81/15 |
| 3,078,744 | 2/1963 | Bronstein ................................. 30/102 |
| 3,082,523 | 3/1963 | Modes et al. ............................ 30/102 |
| 3,146,820 | 9/1964 | Mailloux ................................. 153/54 |
| 3,196,652 | 7/1965 | Meese ....................................... 72/70 |
| 3,376,638 | 4/1968 | Bjalme et al. .......................... 30/102 |
| 3,408,738 | 11/1968 | Schade ...................................... 30/95 |
| 3,545,081 | 12/1970 | Butler ..................................... 30/123 |
| 3,639,980 | 2/1972 | Muse et al. ............................. 30/102 |
| 3,651,569 | 3/1972 | Arnot ....................................... 30/95 |
| 3,764,169 | 10/1973 | St. Clair . |
| 3,867,824 | 2/1975 | Takagi et al. ........................... 72/121 |
| 3,885,261 | 5/1975 | Skvarenina ........................... 7/14.1 R |
| 3,932,937 | 1/1976 | Bastiansen .............................. 30/102 |
| 3,965,572 | 6/1976 | Strybel ................................... 30/102 |
| 4,389,867 | 6/1983 | Whitlock ................................. 19/12 |
| 4,655,064 | 4/1987 | Hoback ...................................... 17/4 |
| 4,769,910 | 9/1988 | Noon . |
| 4,769,911 | 9/1988 | Araki ......................................... 21/6 |
| 5,074,599 | 12/1991 | Wirbel et al. . |
| 5,329,797 | 7/1994 | Calhoun ..................................... 17/4 |
| 5,515,609 | 5/1996 | Sperti . |

*Primary Examiner*—Lowell A. Larson
*Attorney, Agent, or Firm*—Fulbright & Jaworski L.L.P.; Paul E. Krieger; Jan K. Simpson

[57] ABSTRACT

A tool and method for roll-forming a seat and retainer with a shoulder and seal surface capable of operatively engaging a ferrule to form a fluid-tight seal around the outer surface of a rigid tube which is harder than the ferrule.

12 Claims, 5 Drawing Sheets

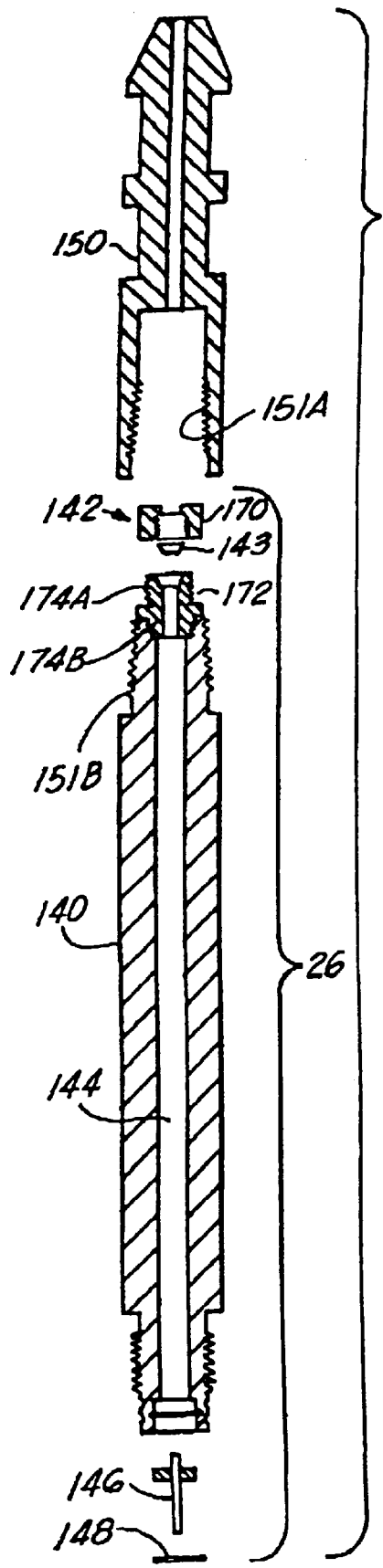
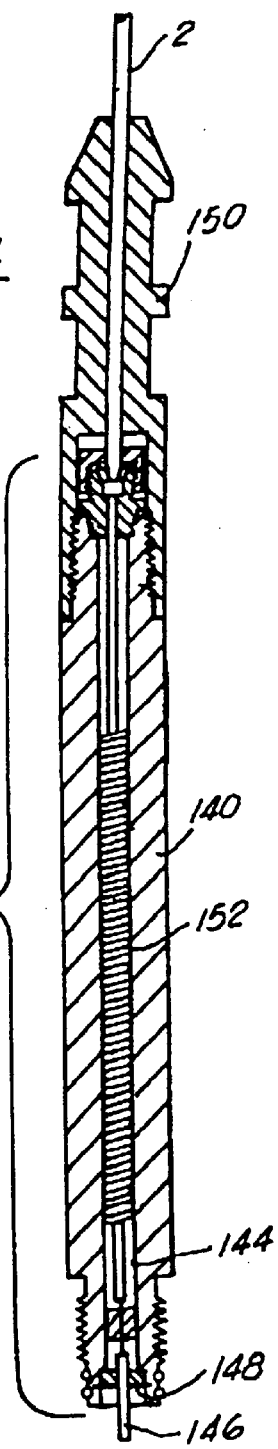
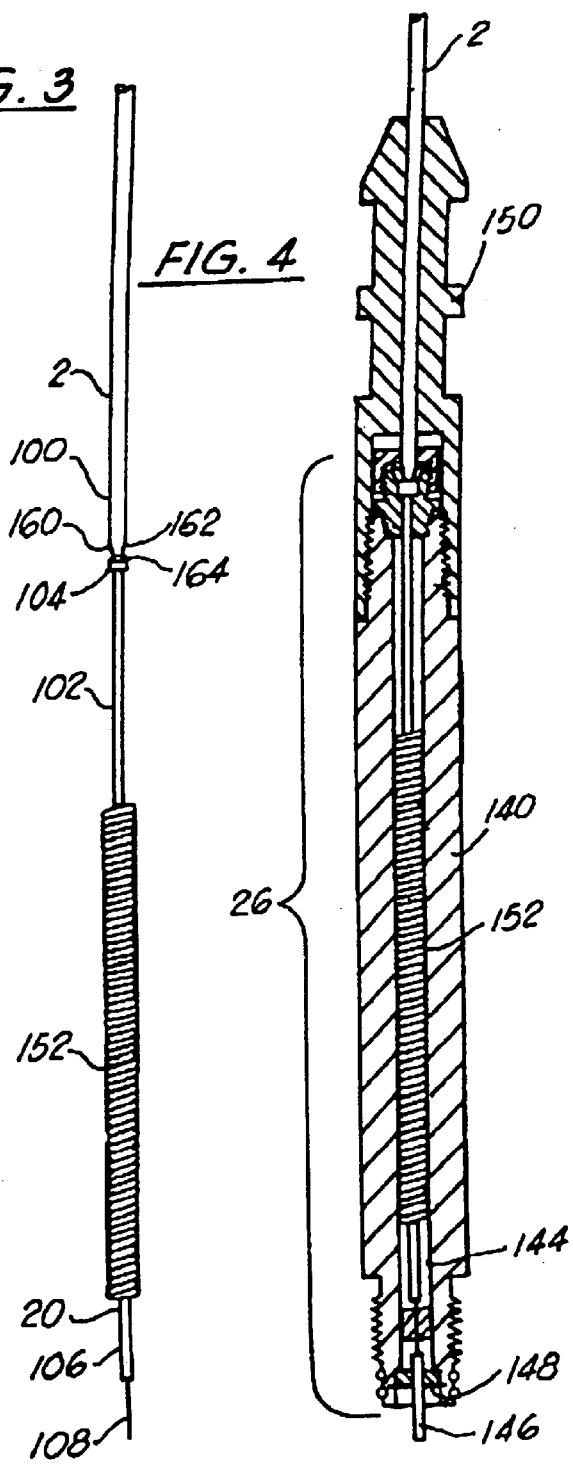
FIG. 3
FIG. 4
FIG. 5

ROLLED-FORMED SEAT AND RETAINER FOR A FLUID-TIGHT FERRULE SEAL ON A RIGID METAL TUBE WHICH IS HARDER THAN THE FERRULE, METHOD AND APPARATUS

BACKGROUND OF THE INVENTION

1. Field of the Invention

The invention relates to ferrule-type seals for rigid metal tubing which is harder than the ferrule and, more particularly, to a roll-formed seat and retainer on such a tube which can be used with a ferrule to form a fluid-tight seal, and a tool and method for forming the seat.

2. Description of the Related Art

The present inventions relate to ferrule-type seals on rigid metal tubes where the tubes are formed of a material that is harder than the ferrule. Commercially-available ferrule fittings are specified for use with rigid metal tubes with a hardness that is lower than the cold-worked, high-strength hardness of most stainless-steel alloys. Thus, ferrule fittings are not used on these types of tubes where high internal tube pressure or high tension loads would push or pull the tube out of the fitting. Thus, the use of ferrule fittings in these types of applications is not recommended.

There are many potential uses of ferrule tube fittings where the metal tube is harder than the ferrule. However, ferrule fittings for such uses are limited because the ferrule cannot deform the tube or bite into the outer surface of the tube to form a seal. Instead, the ferrule deforms against the outer surface of the tube. This type of seal does not have the ability to withstand high pressure or tension forces in the tubes because the ferrule and its associated fittings will blow or pull off the tube when the applied pressure or tension exceeds a certain level.

One application for ferrule fittings where tubes are harder than commercially-available ferrules is in wirelines that are used in conjunction with logging or measurement instruments that are typically lowered into an underground well, such as an oil or gas well, to be positioned adjacent to a subterranean formation to measure pressure, temperature and other downhole characteristics. The diameter of a typical wireline tubing of the type described ranges from about ⅛" to ½". While various types of materials may be used to form the rigid tube, the preferred material is corrosion-resistant with relatively high strength and hardness at elevated temperatures which is accomplished by cold working the material during manufacture. Various types of stainless steel known to those skilled in the industry are typically used.

A seal must be formed in the connection between the wireline tubing and the downhole measuring tool to prevent leakage of well fluids into the tube which causes electrical short circuits. While such a fitting typically uses a ferrule as part of the fitting, even though the ferrule can deform into intimate contact between the tubing and connector walls, the ferrule is unable to bite into the outer surface of the metal tube because the tube is "work hardened" when it is formed into a tube and resists deformation.

Thus, a need exists for a fluid-tight, ferruletype seal on tubes which is harder than the ferrule, which retains the ferrule on the tube and resists failure at high pressures and tension loads. The seal should be one that is formed quickly and easily in the field without the use of complicated or cumbersome tools or machines.

Another problem that can arise in the use of wirelines occurs when the tool is raised out of a well bore. Because of irregularities in the well bore or other problems, it is not uncommon for a downhole tool to get stuck. When that occurs, continued spooling of the wireline at the surface causes increased tensile force along the length of the wireline which, if not stopped, causes the wireline to break. If a break occurs, the tool as well as the length of the wireline tubing beneath the breaking point remain in the bottom of the well.

Fishing operations for retrieving a tool are not easy to perform. However, they are made more difficult and time consuming when a length of wireline is positioned above a tool because the wireline hampers efforts to grasp the tool. Additional time necessary to retrieve a tool translates into downtime for the well logging operations and dramatically increases the cost of the well.

SUMMARY OF THE PRESENT INVENTION

The problems discussed above have been solved by the roll-formed seat and retainer, tool and method of the present invention. The seat and retainer are formed with a tapered seal surface that extends to a shoulder that has a minor diameter deep enough to engage the ferrule for retaining the ferrule on the tube. The shoulder prevents the ferrule from blowing off the tube at high pressures or being pulled out when a relatively high tension is applied to the tube.

One aspect of the present invention includes a specially designed tool that can be used to form a seat and retainer in the shape of a tapered seal surface that extends from the cylindrical outer surface of the tube to a shoulder with a selected minor diameter that is engaged by a ferrule to form a fluid-tight seal and retainer at the ferrule-tube interface.

The tool has a forming wheel with an angled contact surface that, when rolled around the outer surface of the tube with an external force that forces the wheel toward the tube, forms a corresponding angled surface that terminates in a shoulder or ledge on the tube. The tool can be adjusted to provide a seat and retainer of varied depths depending on the needs of the user.

Aside from providing a stop for the ferrule, another advantage of such a seat is that it is formed with a tapered seal surface that is smooth so that the ferrule can be deformed against the surface to form a fluid-tight seal at the interface.

Another advantage of the seat with a tapered seal surface and shoulder in wireline applications is that when the shoulder has a minor diameter deep enough it forms a safety joint in the form of a weakened portion in the wireline that operates as the break point when sufficient tension is applied to the wireline. By providing this safety joint at the connection between the wireline and downhole tool, the wireline breaks at the fitting so that a length of wireline is not left in the hole.

Another aspect of the invention is the method of forming a seat and retainer with a tapered seal surface and shoulder with a forming tool, which has the advantages described above.

BRIEF DESCRIPTION OF THE DRAWINGS

A better understanding of the present invention can be obtained when the following detailed description of an illustrative embodiment is considered in conjunction with the following drawings, in which:

FIG. 3 is an exploded, cross-sectional side view of a cable head adapter for connecting the wireline tubing to a downhole tool;

FIG. 4 is a side view of a length of wireline tubing designed to fit in the cable head adapter of FIG. 3;

FIG. 5 is a cross-sectional side view of the assembled cable head adapter and wireline tubing;

DETAILED DESCRIPTION OF AN ILLUSTRATIVE EMBODIMENT

Although the seat and retainer, method and apparatus of the present invention can be applied to any ferrule-type connection for rigid metal tubes where the tubes are harder than the ferrule, an embodiment of the seat and retainer, method and apparatus is described below in conjunction with a wireline assembly for an underground well because of the advantages of the invention when it is used in that application.

Figure 1:
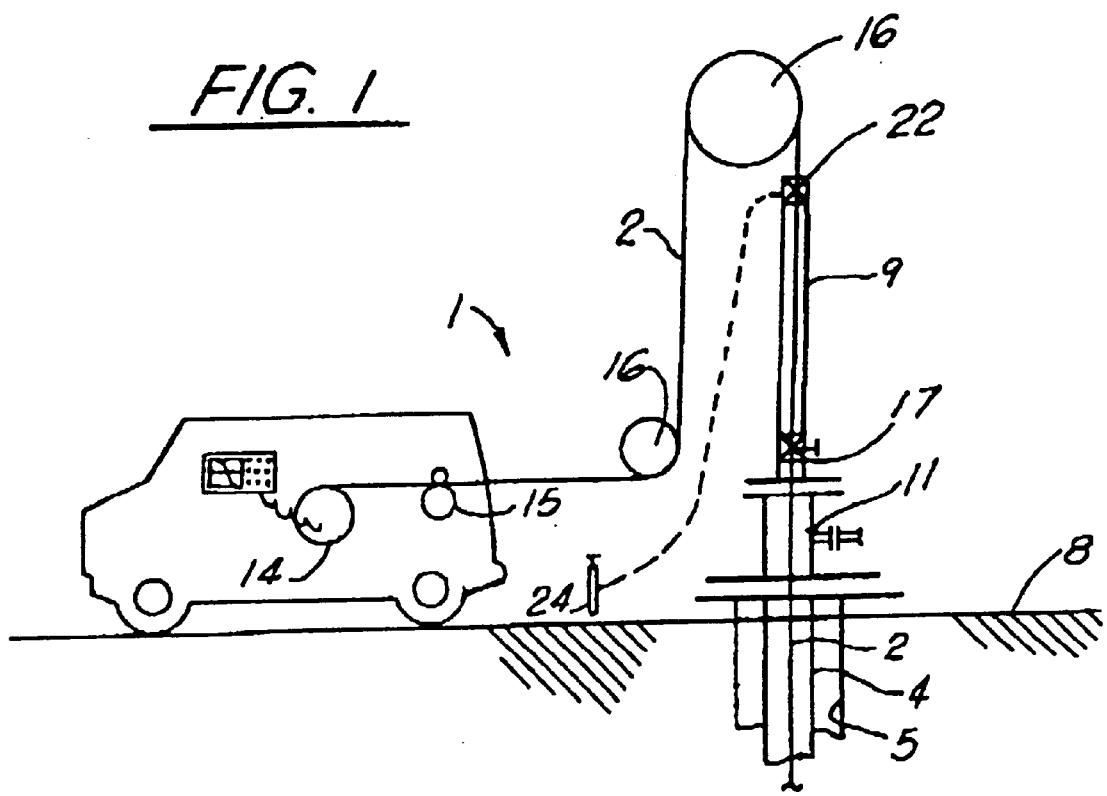
FIG. 1 is a schematic diagram of a wireline assembly which shows wireline tubing connected to a downhole tool.

By way of background, referring to FIG. 1, a typical wireline assembly mounted on a truck is generally designated by reference numeral 1. The assembly includes a length of wireline tubing 2 for supporting a downhole tool 3 in a well bore 5 extending into a subterranean formation 6. The well bore 5 is lined with a casing, which receives production tubing 4. A wellhead 11 is mounted above the ground surface 8, which supports the production tubing 4.

The wireline assembly 1 includes 10,000–20,000 feet of hollow tubing or wireline mounted on a drum 14 as shown in FIG. 1. The wireline 2 runs over sheaves 15 and 16 to the top of a lubricator 9, which is positioned over the wellhead 11. The wireline 2 and logging tool 3 are inserted and removed from the production tubing 4 through the lubricator 9, as known in the industry.

The lubricator 9 has an isolating valve 17 at its lower end and a lubricator seal 22 at its upper end. The wireline 2 extends through the lubricator seal 22, the lubricator 9, and the wellhead 11 into the production tubing 4. A small hydraulic pump 24 pressurizes the lubricator seal 22, enabling it to seal around the wireline 2.

Figure 2:
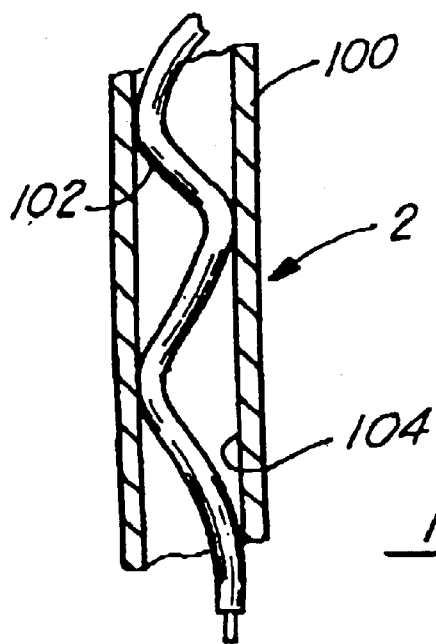
FIG. 2 is a cross-sectional side view of the wireline tubing of FIG. 1.

Referring to FIG. 2, the wireline 2 is shown in greater detail. The wireline 2 has an outside diameter that preferably ranges between about 1/8"–1/2". The wireline 2 is formed of a tube or sheath 100 formed preferably of a corrosion-resistant stainless steel, such as that sold under the name INCOLOY® 825, a trademark of INCO Alloys International, Inc. An insulated conductor 102 extends through the bore 104 of the tube 100. Additional electrical conductors (not shown) can be provided through the tube bore 104 as needed. The insulated conductor 102 is preferably formed of a copper wire surrounded by an insulation covering such as Kapton®, a trademark of DuPont. The formation and structure of such tubes with conductors in them are described in greater detail in U.S. Pat. Nos. 5,122,209 and 5,495,755.

An adapter 26 which includes an adaptor body 140 with a bore 144 is shown in FIGS. 3 and 5, which is used to connect the wireline 2 to the tool 3 (FIG. 1). As shown in FIG. 5, the conductor 102 extends through the bore 144 and is electrically connected to a plug 146 at the lower end of the adapter body 140. The plug 146 is adapted for electrical connection with the downhole tool 3, and is secured to the bottom end of the adapter body 140 through a retainer 148 as is known in the industry. At the top end of the adapter body 140, a ferrule-type fitting, generally designated by reference numeral 142, connects the adapter body 140 to the tube 2. A fishing neck 150 is connected through screw threads 151a to threads 151b on the top of the adapter 26 to facilitate retrieval of the downhole tool 3 if the wireline 2 should break.

The ferrule-type fitting 142 includes a nut 170 that is threaded over a fitting body 172. The fitting body 172 includes a first set of threads 174A on one end for mating with threads on the nut 170 and a second set of threads 174B on the other end for mating with threads on the upper end of the adapter body 140.

During a running in operation, or lowering of the wireline 2 into the production tubing 4, the tube 100 and the electrical conductor 102 tend to elongate at different rates due to thermal effects because the tube 100 and the electrical conductor 102 have significantly different coefficients of thermal expansion. To accommodate these differences, as shown in FIGS. 4 and 5, a coiled length of the conductor 152 is provided.

To prepare the wireline 2 for connection to the downhole tool 3, a portion of the tube 100 is typically trimmed from the bottom end of the wireline 2, leaving an exposed length of the insulated conductor 102. After a seat and retainer, generally designated by reference numeral 160, is formed on the end of the wireline tubing 2 in accordance with the invention, as described in greater detail below, the wireline tubing 2 is passed through the lubricator seal 22 at the lubricator 9, the fishing neck 150, the ferrule-type fitting 142, and the cable adapter 26. The downhole tool 3 is then connected to the cable head adapter 26 to complete the connection of the wireline 2 to the downhole tool 3.

Figure 6A:
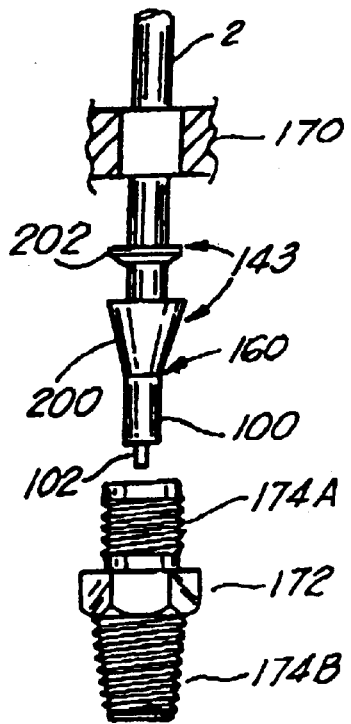
FIG. 6A is an exploded side view of an example of one application of the present invention where a ferrule-type fitting for connecting the tool in FIG. 5 to a wireline.
Figure 6B:
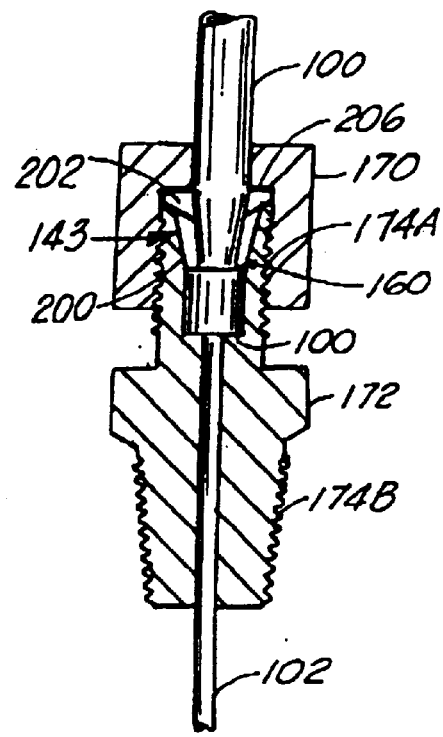
FIG. 6B is a cross-sectional side view of the ferrule-type fitting of FIG. 6A in assembled condition.

In accordance with the invention, referring to FIGS. 6A and 6B, the seat 160 and retainer is formed on the outer surface of the tube 100 for engagement by the ferrule 143. The seat includes a seal surface 162 that tapers between the outer surface of the tube 100 and a shoulder 164, which itself extends between the outer tube surface and a minor diameter where it meets the tapered seal surface. The seal surface 162 does not have to be formed with a straight taper, but it can have other shapes that effectively provide a seal when engaged by the ferrule.

The tapered seal surface 162 and shoulder 164 are formed with a specially designed forming tool which is also part of the invention and described in greater detail below. The seat 160 is unique because it can be roll formed in the field after the end of the tube 100 is trimmed and provides an effective fluid-tight seal and retainer between a ferrule and a tube that is harder than the ferrule.

Figure 7:
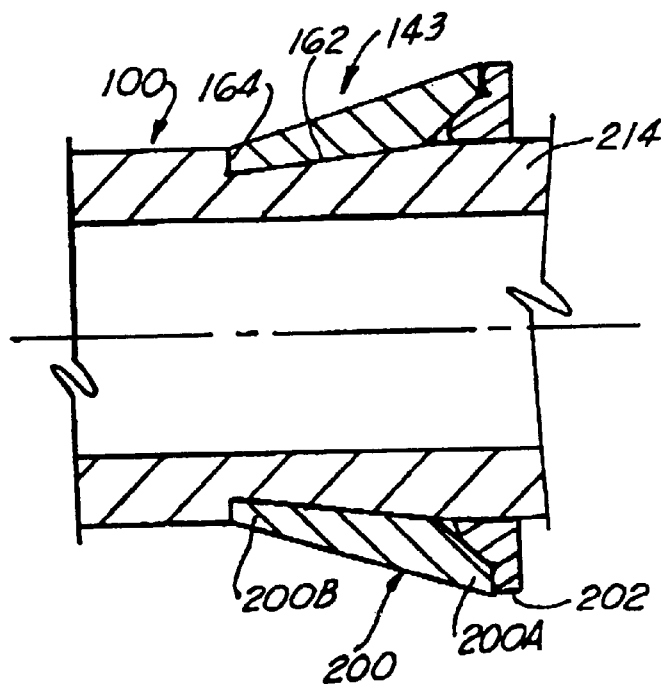
FIG. 7 is a cross-sectional side view of the wireline tubing of FIGS. 1–6B, illustrating a seat roll-formed in the outer surface of the tube in accordance with the invention and a ferrule in the seat.

The tapered seal surface 162 and shoulder 164 are formed with the tool described below which is similar in design to a typical pipe cutting tool, which simultaneously rolls around the tube and applies an external force in the direction of the tube, which roll forms the tapered seal surface 162 and shoulder 164 until the desired depth is achieved. In addition to deforming the outer surface of tube 100, the metal forming the tube wall is cold worked and thereby strengthened in the vicinity of the seal surface, and the surface defining the tapered seal surface is polished. Because the seat 160 is roll formed, there can be a slight bulge extending into the inner passageway of the tube as shown in FIG. 7, when the minor diameter is formed deep enough. However, this bulge is not large enough to close the passageway or have any negative effect on the conductors in the tube.

The tapered seal surface 162 and shoulder 164 can be formed at various depths in the outer surface of the tube, depending on the needs of the operator. When the tapered seal surface 162 and shoulder 164 are formed at a shallow depth, a highly polished mating surface is formed around the tube 100. This surface along with the shoulder enable the ferrule 143 to form an effective seal with the outer surface of the tube because the shoulder provides a seat and retainer for the ferrule and the smooth outer surface eliminates surface irregularities in the metal tube.

When the minor diameter of the shoulder 164 is only slightly smaller than the tube diameter, the tube is not weakened enough to break at that point before breakage could occur in any other point in the wireline. However, if a weakening effect is desired at the seat, the tapered seal surface and shoulder can be formed with a minor diameter deep enough to weaken the tube 100 at that point. For example, if the shoulder has a depth of 0.002" in a tube of ⅛" diameter with a wall thickness of 0.02", the tube is weakened sufficiently so that the wireline will break at the weakened portion when an undue tension force is exerted on the wireline. This eliminates the problems in a fishing operation caused when a length of wireline is left above the tool.

The ferrule 143 used in the fitting 142, as shown in FIGS. 6A, 6B and 7, includes a ferrule body 200 and a cap 202, both of which are commercially available and formed of a deformable, corrosion-resistant material such as a nickel alloy sold by the INCO Alloys International, Inc. known as Hastalloy C276. Both the ferrule body 200 and the cap 202 fit around the tubing 100. The ferrule body 200 has a wide end 200A and a narrow end 200B. The narrow end 200B abuts the shoulder 164.

The ferrule body 200 and cap 202 mate with each other through abutting surfaces shown in detail in FIG. 7. The end 200A is tapered with a small flattened portion on its upper end. The abutting surface of the cap 202 has two curved portions. The fitting body 172 has an internal tapered surface that engages the outer tapered surface of the ferrule body 200. When the nut 170 is screwed onto the fitting body 172, as shown in FIG. 6B, the nut 170 presses the cap 202 against the ferrule body 200 and the internal tapered surface of the fitting body 172 applies force against the ferrule body 200 which causes the cap 202 and ferrule body 200 to deform and impart an axial force as well as an inwardly lateral force against the tube. These deformations form a tight fit against the smooth surface of the tapered seal surface 162 and the shoulder 164. Once properly tightened, the ferrule-type fitting 142 forms a fluid-tight seal to prevent leakage of fluids into and out of the tube 100.

Figure 8A:
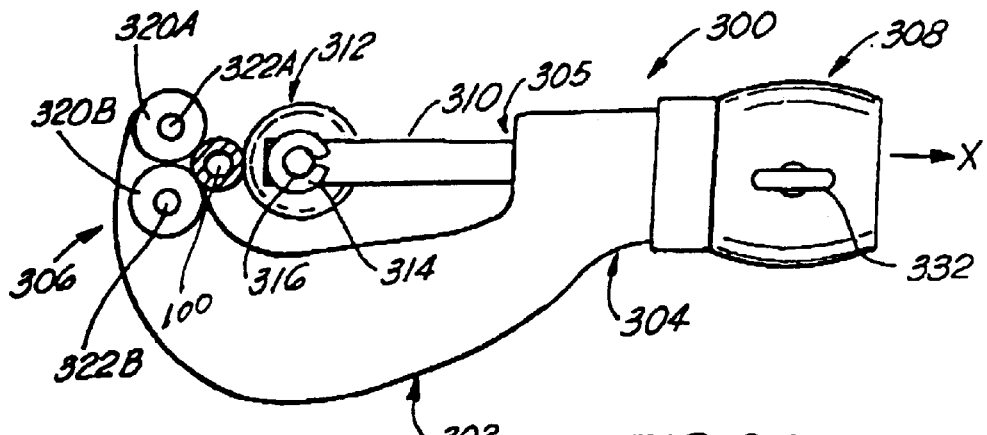
FIGS. 8A and 8B are front and side elevational views of a tool for forming a seat of the type shown in FIG. 7 in accordance with the invention.
Figure 8B:
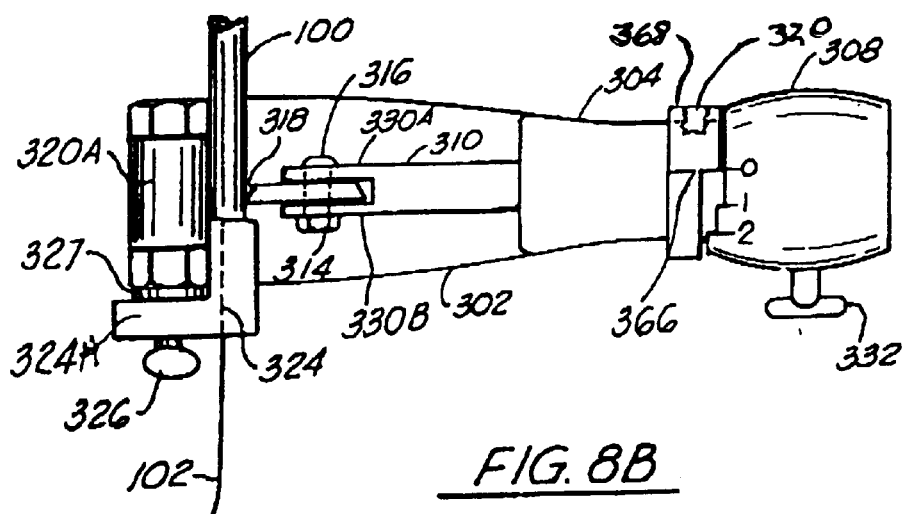
Figure 8C:
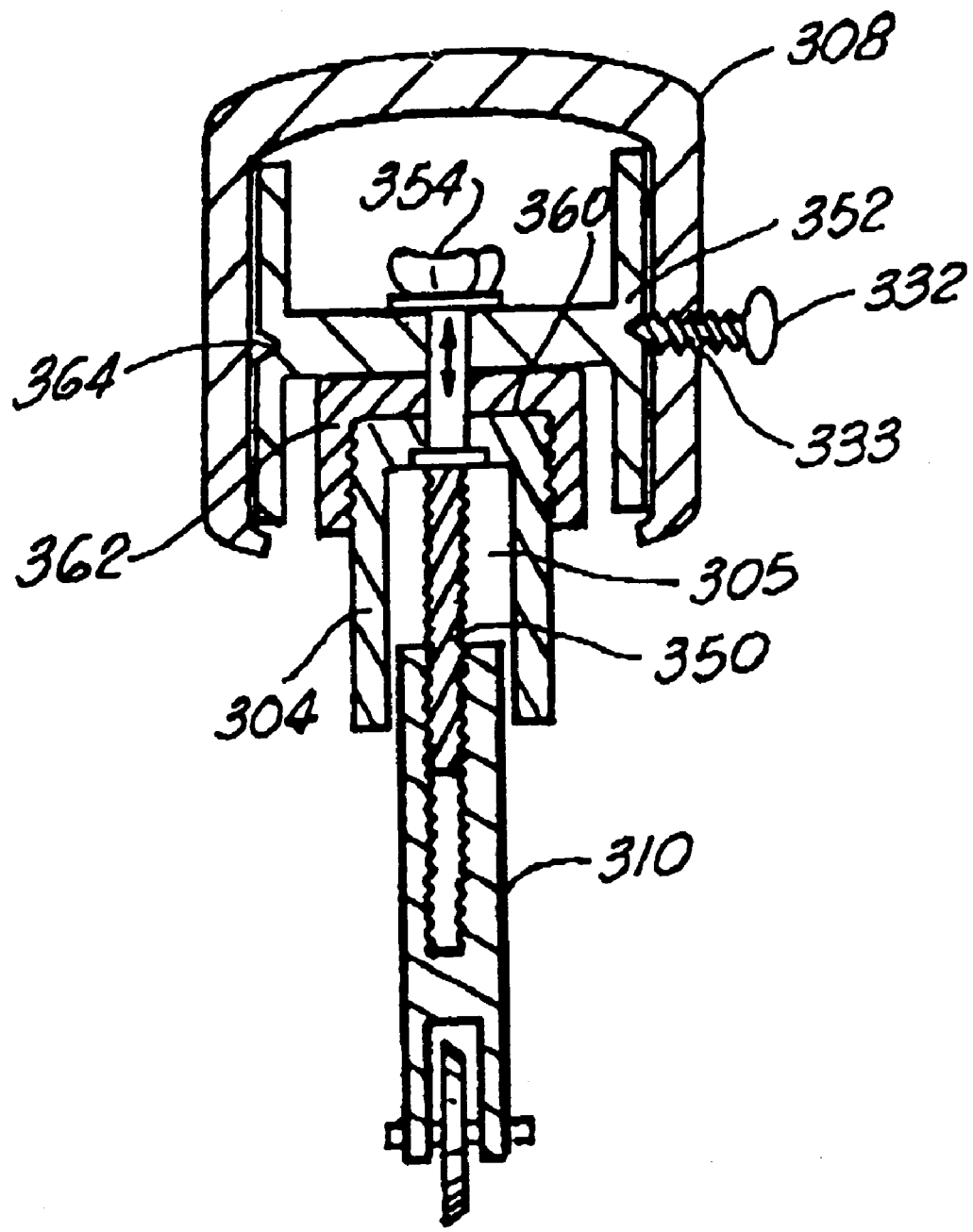
FIG. 8C is a cross-sectional side view of the tool of FIGS. 8A and 8B.

Referring to FIGS. 8A, 8B and 8C, a forming tool 300 is shown, for forming the tapered seal surface 163 and shoulder 164 of FIG. 7. The forming tool 300 includes a C-shaped frame or jaw 302, and a handle 304 extending from the jaw 302. A shaft 310, which extends into the opening of the jaw 302, is mounted in the handle 304. The shaft is movable back-and-forth relative to the outer end 306 of the jaw 302 through a rotatable barrel 308, that is connected to the shaft 310 through a screw mechanism described in greater detail below A forming wheel 312 is mounted on the end of the shaft 310, which is located in the jaw 302 and positioned so that the forming wheel 312 can be moved against a length of tubing 100 that is held in place on a support formed between a pair of rollers 320A and 320B that are, in turn, mounted for rotation about shafts 322A and 322B, respectively, on the end 306. The forming wheel 312 is rotatably mounted on the outer end of the shaft 310 through a pin 316, the forming wheel being held in place by a snap ring 314. Alternatively, a smooth, non-rotatable support surface (not shown) at the end 306 of the jaw 302 could be used instead of the rollers 320A and 320B to hold the length of tubing 100.

As shown in FIG. 8B, a tube stop 324 is held in place on the end 306 of the jaw 302 through a screw 326 for engaging the end of the tube 100 so the seat 160 can be formed at a predetermined location on the tube 100. As shown in FIG. 8B, the stop 324 has a slot, shown by dotted lines 324A, for allowing the conductor 102 to project through the stop 324 when the tube 100 is in place. One or more shims 327 can be placed between the stop 324 and the rollers for properly positioning the stop for tubing of different diameters.

When a length of tubing is positioned against the rollers 320A and 320B, the rotatable barrel 308 is used to move the forming wheel into engagement with the tubing as described in greater detail below.

Figure 9:
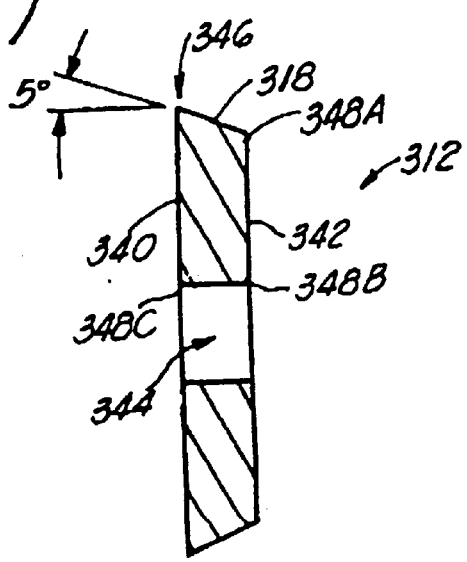
FIG. 9 is a cross-sectional front view of a forming wheel used in the tool of FIGS. 8A, 8B and 8C.

As shown in FIG. 9, the forming wheel 312 is shaped as a roller which has an outer surface 318 formed at an angle less than 90 degrees relative to the outer surface of the tubing 100. Preferably, the angle is about 5 degrees as shown in FIG. 9, with the larger diameter side 340 of the wheel being about 0.750" in diameter and the forming surface 318 having a width of approximately 0.125".

The forming wheel 312 is preferably formed of steel, such as for example AISI A-7, which is hardened to allow it to shape the stainless steel tube 100. The forming wheel 312 has a sharp edge 346 for cutting into the outer surface of the tube 100, while the other edges 348A, 348B and 348C are slightly rounded, having a radius ranging from about 0.010"–0.020".

The forming wheel 312 is moved toward and away from the length of tubing through a threaded connection between the shaft 310 and a threaded shaft 350, as shown in FIG. 8C. The shaft 350 includes a threaded cap 362 mounted on a shoulder 360 formed on the handle 304. The cap 360 retains the threaded shaft 350 of the handle 304. A screw 354 connects the threaded shaft 350 to the top end of a sleeve 352.

The sleeve 352 also includes a notch 364 that extends around the circumference of the sleeve 352. The barrel 308 is fitted over the sleeve 352 and also includes a threaded opening 333 positioned adjacent to the notch 364. A thumb screw 332, used to tighten the barrel 308, extends through a threaded opening 333 and bears against the notch 364. When the thumb screw 332 is tightened, the outer barrel 308 is fixed relative to the sleeve 352. When the thumb screw 332 is loosened, the barrel 308 can be rotated relative to the sleeve 352. Alternatively, a split pressure ring (not shown) or other suitable stop mechanisms known in the art could be used.

When the tube 100 is placed as shown in FIG. 8A, the outer barrel 308 is rotated clockwise in order to move the shaft 310 until the forming wheel 312 contacts the outer surface of the tube. When the wheel 312 contacts the outer surface of the tube, the thumb screw 332 is loosened to allow the barrel to be rotated about the sleeve 352. This allows the operator to align the "0" marking on the outer barrel 308 to a reference marking 366 as shown in FIG. 8B. Once the "0" marking and reference line 366 are aligned, the thumb screw is tightened.

The other two reference markings on the barrel 308, indicated as "1" and "2", allow the operator to adjust the depth of the tapered indentation 162 and shoulder 164. When the barrel 308 is rotated to the "1" marking from the "0" marking, a shoulder 164 having a relatively shallow depth is formed in the outer surface of the metal tube 100. A shoulder of this depth allows the ferrule 143 to form a fluid-tight seal without weakening the tube 100.

However, if the operator wants to provide a weakened portion in the tube, the barrel is rotated from the "0" to the "2" marking, where the depth of the shoulder 164 is formed as described above. This increases the stress concentration at the edge defined in the groove in addition to providing a seat for the ferrule and materially weakens the tube so that a tensile force is applied to the tube above a predetermined level that will cause the tube to fail at that point.

A stop mechanism can be provided to prevent the shoulder from being formed deeper than the desired depth. An example of such a stop mechanism is shown in FIG. 8B where an adjustable ring 366 has a series of steps that can be aligned with a series of cooperating steps in the barrel 308. A set screw 320 locks the ring 368 at desired depth.

Once the tube 100 is engaged by the forming wheel 312, the barrel 308 is tightened slightly to impart an external force on the forming wheel, and the tool 300 is rotated about the metal tube until it can be rotated easily. Pressure is then gradually increased between the wheel and the tube and the operation is repeated until the desired depth is reached as indicated by the reference markings on the barrel. The angle of the tapered seal surface 162 will then be essentially the same as the angle defined by the forming surface 318 of the wheel 312.

Thus, a tubing seat and retainer, forming tool and method for forming a the tubing seat for a ferrule-type seal on the outer surface of a rigid metal tube is described in accordance with the invention with the advantages and improvements discussed above. The seat is unique because it is formed in the outer surface of a tube which is harder than the ferrule to form a fluid-tight seal at a selected depth that may or may not be formed to break at a predetermined tension level. The tool is simple in operation and can be used to form a seat in the field.

Having described the invention, it will be understood to one with ordinary skill in the arts that various modifications, improvements and adaptations of the techniques, procedures, materials and equipment can be made and it is intended that all such variations will be encompassed by the scope of the appended claims set forth below.

I claim:

1. A tool for roll-forming a seat and retainer capable of operatively engaging and retaining a ferrule to form a fluid-tight seal around the outer surface of a rigid tube which is harder than the ferrule, comprising:
   (a) a frame;
   (b) a forming wheel rotatably mounted on the frame;
   (c) a support on the frame facing the forming wheel for supporting the rigid tube;
   (d) a mechanism for selectively moving at least one of the forming wheel and support back-and-forth relative to each other so the forming wheel can engage the outer surface of the tube;
   (e) the wheel having an outer surface with two sides, a relatively sharp edge on one side and a relatively smooth surface tapering inwardly from the edge to the other side, to roll form a seal surface and shoulder around the outer surface of the tube for operatively engaging and retaining a ferrule; and
   (f) whereby, the shoulder can be formed with a minor diameter of a selected depth when the frame is rotated around the tube and the outer surface of the forming wheel engages the tube with an external force imparted on the forming wheel in the direction of the tube.

2. The tool of claim 1, wherein the frame includes a C-shaped jaw with the support and wheel located on opposing ends of the "C".

3. The tool of claim 1, and further including a shaft connected to the frame, the forming wheel being mounted on one end of the shaft, the frame and shaft including a screw mechanism for moving the shaft and forming wheel back-and-forth relative to the frame.

4. The tool of claim 3, and further including a stop mechanism operatively connected between the frame and shaft for limiting the distance the forming wheel can move toward the tube.

5. The tool of claim 1, wherein the wheel is mounted on an axis parallel with the axis of the tube.

6. The tool of claim 1, wherein the support includes a pair of rollers rotatably mounted on the frame for supporting the tube.

7. The tool of claim 1, wherein the outer surface of the wheel forms an acute angle relative to the axis of the tube.

8. The tool of claim 7, wherein the wheel includes an outer edge which is relatively sharp for cutting into the tube outer surface and forming the shoulder.

9. The tool of claim 7, wherein the tapered surface is formed at an angle of about 5° relative to the outer surface of the tube.

10. The tool of claim 1, and further including a tube stop connected to the frame for positioning the tube at a predetermined position on the support.

11. A tool for roll-forming a seat and retainer capable of operatively engaging and retaining a ferrule to form a fluid-tight seal around the outer surface of a rigid tube which is harder than the ferrule, comprising:
   (a) a frame;
   (b) a forming wheel rotatably mounted on the frame;
   (c) a support on the frame facing the forming wheel for supporting the rigid tube;
   (d) a mechanism for selectively moving at least one of the forming wheel and support back-and-forth relative to each other so the forming wheel can engage the outer surface of the tube:
   (e) the wheel having an outer surface shaped to roll form a seal surface and shoulder around the outer surface of the tube for operatively engaging and retaining a ferrule;
   (f) whereby, the shoulder can be formed with a minor diameter of a selected depth when the frame is rotated around the tube and other outer surface of the forming wheel engages the tube with an external force imparted on the forming wheel in the direction of the tube;
   (g) a shaft connected to the frame, the forming wheel being mounted on one end of the shaft, the frame and shaft including a screw mechanism for moving the shaft and forming wheel back-and-forth relative to the frame; and (h) a handle on the shaft opposite the forming wheel, a release mechanism for allowing the handle to move freely relative to the shaft, and reference marks on the handle and frame so that the handle can be referenced when the wheel engages the tube.

12. The tool of claim 11, and further including reference marks on the handle and frame for indicating the distance the wheel should move toward the tube.

* * * * *